(12) United States Patent
Kordybach et al.

(10) Patent No.: US 12,389,276 B2
(45) Date of Patent: Aug. 12, 2025

(54) INFORMATION EXCHANGE BETWEEN THE CU-CP AND THE CU-UP FOR FLEXIBLE SCG (DE) ACTIVATION

(71) Applicant: Nokia Technologies Oy, Espoo (FI)

(72) Inventors: Krzysztof Kordybach, Wroclaw (PL); Subramanya Chandrashekar, Bangalore (IN); Tero Henttonen, Espoo (FI); Henri Markus Koskinen, Espoo (FI); Elena Virtej, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 357 days.

(21) Appl. No.: 17/968,038

(22) Filed: Oct. 18, 2022

(65) Prior Publication Data
US 2023/0129661 A1   Apr. 27, 2023

(30) Foreign Application Priority Data
Oct. 21, 2021   (IN) .............................. 202141047920

(51) Int. Cl.
*H04W 28/08* (2023.01)
*H04W 28/086* (2023.01)

(52) U.S. Cl.
CPC ... *H04W 28/0864* (2023.05); *H04W 28/0967* (2020.05)

(58) Field of Classification Search
CPC ..... H04L 5/001; H04L 5/0053; H04L 5/0098; H04W 76/16; H04W 76/27; H04W 88/10; H04W 76/15; H04W 92/20; H04W 24/10; H04W 28/0815; H04W 28/0967
See application file for complete search history.

(56) References Cited

U.S. PATENT DOCUMENTS

| | | | | |
|---|---|---|---|---|
| 2020/0163144 | A1* | 5/2020 | Ryoo | H04W 76/20 |
| 2022/0167449 | A1* | 5/2022 | Wang | H04L 5/001 |
| 2022/0394620 | A1* | 12/2022 | Hu | H04W 76/27 |
| 2023/0262501 | A1* | 8/2023 | Rugeland | H04W 76/27 370/252 |
| 2023/0337020 | A1* | 10/2023 | Da Silva | H04W 24/04 |
| 2023/0345579 | A1* | 10/2023 | Teyeb | H04W 76/34 |
| 2023/0362817 | A1* | 11/2023 | Da Silva | H04W 24/10 |
| 2023/0371064 | A1* | 11/2023 | You | H04B 7/06952 |
| 2024/0008115 | A1* | 1/2024 | Wu | H04W 76/20 |

* cited by examiner

Primary Examiner — Jung Liu
(74) Attorney, Agent, or Firm — Lippes Mathias LLP (57) ABSTRACT

A method including using master cell group resources for a downlink data transmission to a user equipment, wherein the user equipment is configured with at least one secondary cell group terminated split bearer and a secondary cell group is deactivated; determining, at a centralized central unit user plane, when secondary cell group resources of the deactivated secondary cell group are needed, wherein the determining is based, at least partially, on a data volume threshold for a data radio bearer as configured by a central unit control plane; and based upon the determining that the secondary cell group resources are needed, sending a notification to the central unit control plane to trigger activation of the secondary cell group resources.

4 Claims, 5 Drawing Sheets

INFORMATION EXCHANGE BETWEEN THE CU-CP AND THE CU-UP FOR FLEXIBLE SCG (DE) ACTIVATION

BACKGROUND

Technical Field

The example and non-limiting embodiments relate generally to wireless communication and, more particularly, to determining resources for wireless communication.

Brief Description of Prior Developments

The disaggregated 5G architecture is defined in 3GPP decomposing the gNB into multiple logical entities, where the gNB-CU-CP hosts the PDCP(c) and RRC layers, gNB-CU-UP hosts the PDCP(u) and SDAP protocols, while the gNB-DU hosts the RLC/, MAC and PHY layers. The scheduling operation takes place at the gNB-DU.

SUMMARY

The following summary is merely intended to be an example. The summary is not intended to limit the scope of the claims.

In accordance with one aspect, an example method is provided including using master cell group resources for a downlink data transmission to a user equipment, wherein the user equipment is configured with at least one secondary cell group terminated split bearer and a secondary cell group is deactivated; determining, at a centralized central unit user plane, when secondary cell group resources of the deactivated secondary cell group are needed, wherein the determining is based, at least partially, on a data volume threshold for a data radio bearer as configured by a central unit control plane; and based upon the determining that the secondary cell group resources are needed, sending a notification to the central unit control plane to trigger activation of the secondary cell group resources.

In accordance with another aspect, an example apparatus comprising at least one processor; and at least one non-transitory memory including computer program code, the at least one memory and the computer program code configured to, with the at least one processor, cause the apparatus to: use master cell group resources for a downlink data transmission to a user equipment, wherein the user equipment is configured with at least one secondary cell group terminated split bearer and a secondary cell group is deactivated; determine, at a central unit user plane, when secondary cell group resources of the deactivated secondary cell group are needed, wherein the determining is based, at least partially, on a data volume threshold for a data radio bearer as configured by a central unit control plane; and based upon the determining that the secondary cell group resources are needed, send a notification to the central unit control plane to trigger activation of the secondary cell group resources.

In accordance with another aspect, and example non-transitory program storage device is provided, readable by a machine, tangibly embodying a program of instructions executable by the machine for performing operations, the operations comprising: using master cell group resources for a downlink data transmission to a user equipment, wherein the user equipment is configured with at least one secondary cell group terminated split bearer and a secondary cell group is deactivated; determining, at a central unit user plane, when secondary cell group resources of the deactivated secondary cell group are needed, wherein the determining is based, at least partially, on a data volume threshold for a data radio bearer as configured by a central unit control plane; and based upon the determining that the secondary cell group resources are needed, sending a notification to the central unit control plane to trigger activation of the secondary cell group resources.

In accordance with another aspect, an example apparatus is provided comprising: means for using master cell group resources for a downlink data transmission to a user equipment, wherein the user equipment is configured with at least one secondary cell group terminated split bearer and a secondary cell group is deactivated; means for determining, at a central unit user plane, when secondary cell group resources of the deactivated secondary cell group are needed, wherein the determining is based, at least partially, on a data volume threshold for a data radio bearer as configured by a central unit control plane; and means for, based upon the determining that the secondary cell group resources are needed, sending a notification to the central unit control plane to trigger activation of the secondary cell group resources.

In accordance with another aspect, an example apparatus is provided comprising: processing circuitry; and memory circuitry including computer program code, where the memory circuitry and the computer program code configured to, with the processing circuitry, cause the apparatus to: use master cell group resources for a downlink data transmission to a user equipment, wherein the user equipment is configured with at least one secondary cell group terminated split bearer and a secondary cell group is deactivated; determine, at a central unit user plane, when secondary cell group resources of the deactivated secondary cell group are needed, wherein the determining is based, at least partially, on a data volume threshold for a data radio bearer as configured by a central unit control plane; and based upon the determining that the secondary cell group resources are needed, send a notification to the central unit control plane to trigger activation of the secondary cell group resources.

In accordance with another aspect, an example method is provided comprising: determining, by a central unit user plane, required secondary cell group resources; and sending information from the central unit user plane to a central unit control plane, where the information comprises activity information associated with a data path of a secondary cell group, where the information is at least partially based upon the determining by the central unit user plane, and where the information is configured to be used by the central unit control plane to trigger activation of the secondary cell group resources.

In accordance with another aspect, an example method is provided comprising: receiving by a central unit control plane information from a central unit user plane, where the information is based upon a determination by the central unit user plane that secondary cell group resources are required; and based, at least partially, upon the central unit control plane receiving the information from the central unit user plane, the central unit control plane causing activation of the secondary cell group resources.

In accordance with another aspect, an example method is provided comprising: determining, by a central unit user plane, that secondary cell group resources are needed; and based upon the determination by the central unit user plane that the secondary cell group resources are needed, the central unit user plane causing at least one of: implicitly triggering a central unit control plane to activate secondary cell group resources by sending from the central unit user plane a notification regarding data activity getting above a configured throughput threshold, or explicitly triggering the central unit control plane to activate the secondary cell group resources by sending a secondary cell group activity request indication by including data activity information associated with a data path of a secondary cell group distributed unit.

BRIEF DESCRIPTION OF THE DRAWINGS

The foregoing aspects and other features are explained in the following description, taken in connection with the accompanying drawings, wherein.

DETAILED DESCRIPTION

Figure 1:
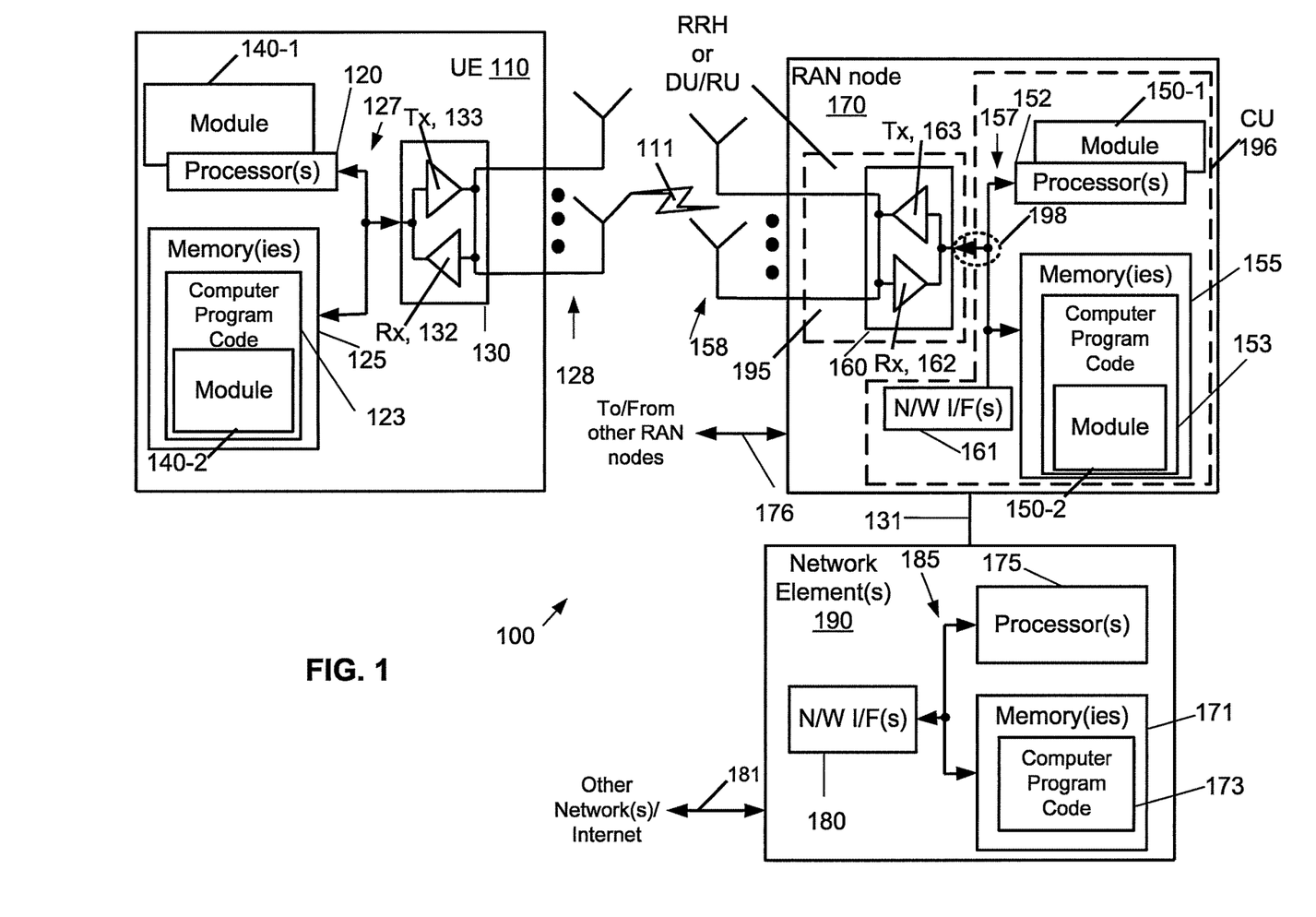
FIG. 1 is a block diagram of one possible and non-limiting example system in which the example embodiments may be practiced.

The following abbreviations that may be found in the specification and/or the drawing figures are defined as follows:

3GPP third generation partnership project
5G fifth generation
5GC 5G core network
AMBR aggregate maximum bit rate
AMF access and mobility management function
CU central unit
CU-CP central unit control plane
CU-UP central unit user plane
DL downlink
DRB data radio bearer
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
EPC evolved packet core
E-UTRA evolved universal terrestrial radio access, i.e., the LTE radio access technology
gNB (or gNodeB) base station for 5G/NR, i.e., a node providing NR user plane and control plane protocol terminations towards the UE, and connected via the NG interface to the 5GC
I/F interface
LTE long term evolution
MAC medium access control
MCG master cell group
MME mobility management entity
MN master node
MR-DC multi-radio dual connectivity
ng or NG new generation
ng-eNB or NG-eNB new generation eNB
nGBR non-guaranteed bit rate
NR new radio
N/W or NW network
PDCP packet data convergence protocol
PHY physical layer
QoS quality of service
RAN radio access network
Rel release
RLC radio link control
RRH remote radio head
RRC radio resource control
RU radio unit
Rx receiver
SCG secondary cell group
SDAP service data adaptation protocol
SGW serving gateway
SMF session management function
SN secondary node
TS technical specification
Tx transmitter
UE user equipment (e.g., a wireless, typically mobile device)
UPF user plane function Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190).

The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. A gNB Central Unit (gNB-CU) is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. A gNB-CU-Control Plane (gNB-CU-CP) is a logical node hosting the RRC and the control plane part of the PDCP protocol of the gNB-CU for an en-gNB or a gNB. The gNB-CU-CP terminates the E1 interface connected with the gNB-CU-UP and the F1-C interface connected with the gNB-DU. A gNB-CU-User Plane (gNB-CU-UP) is a logical node hosting the user plane part of the PDCP protocol of the gNB-CU for an en-gNB, and the user plane part of the PDCP protocol and the SDAP protocol of the gNB-CU for a gNB. The gNB-CU-UP terminates the E1 interface connected with the gNB-CU-CP and the F1-U interface connected with the gNB-DU. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Figure 2:
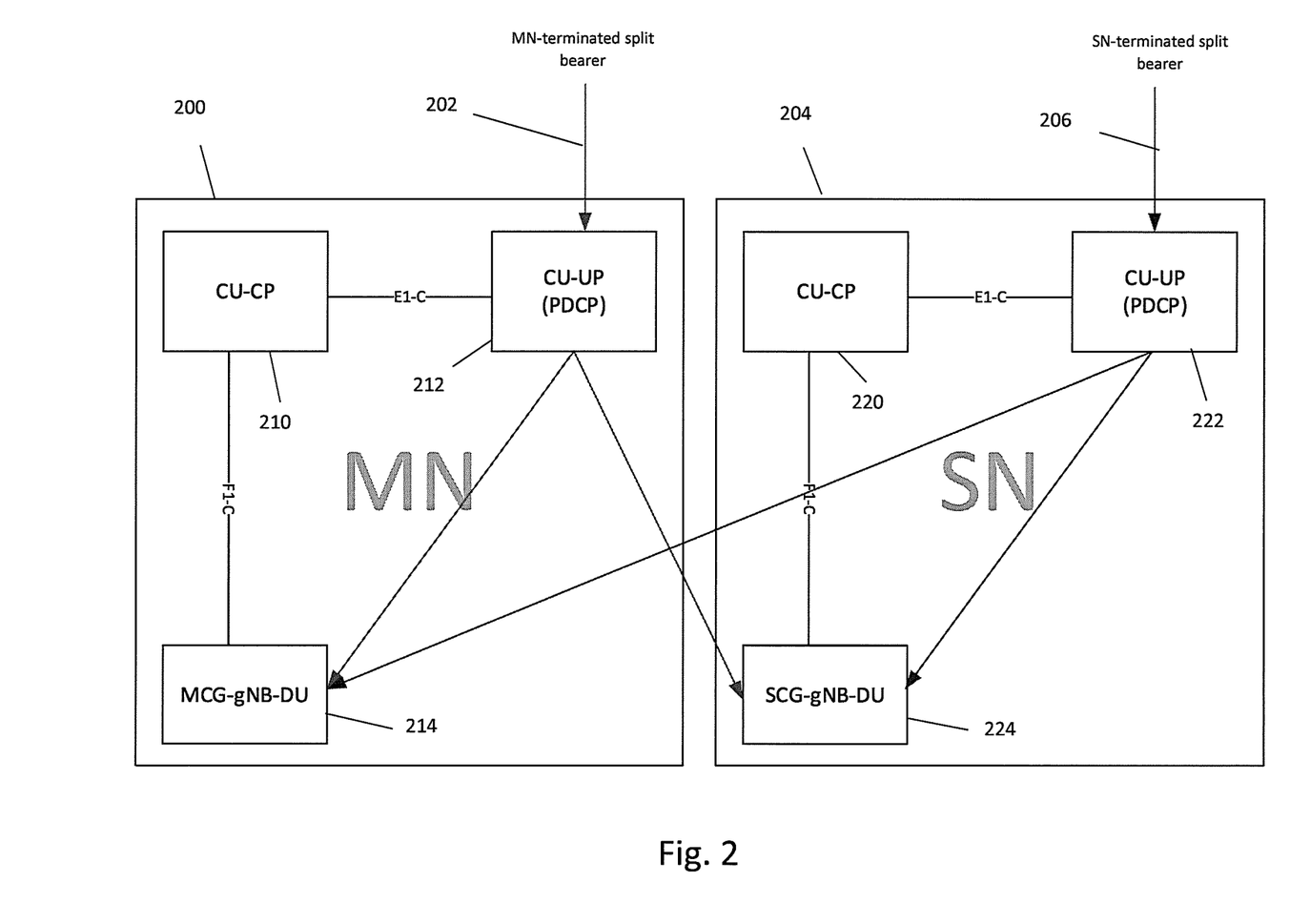
FIG. 2 is a block diagram illustrating some components with a master node and a secondary node.
Figure 6:
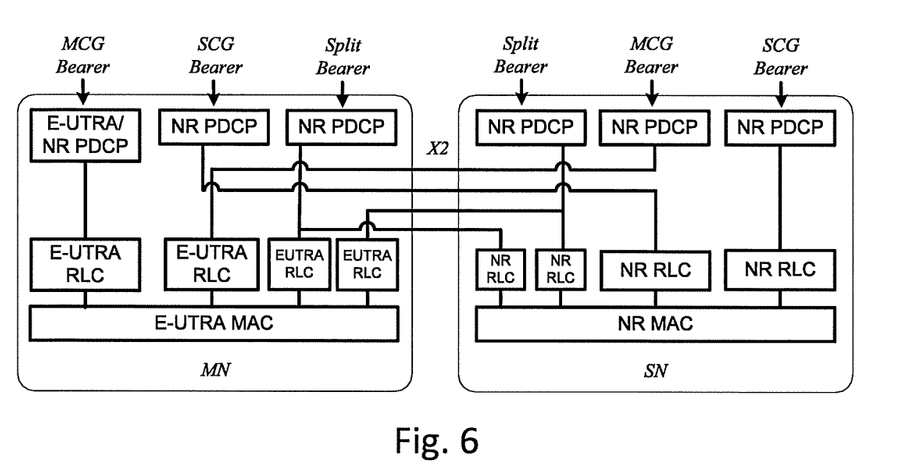
FIG. 6 is a diagram illustrating a network side protocol termination options for MCG, SCG and split bearers in MR-DC with EPC (EN-DC)
Figure 7:
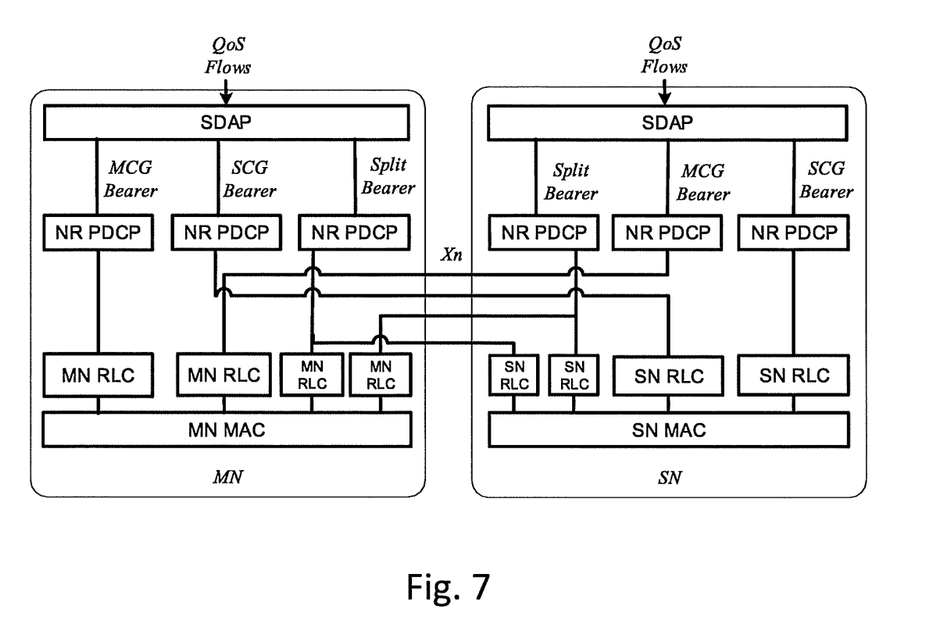
FIG. 7 is a diagram illustrating a network side protocol termination options for MCG, SCG and split bearers in MR-DC with 5GC (NGEN-DC, NE-DC and NR-DC).

Referring also to FIG. 2, a diagram of an example embodiment is shown with a master node 200 with a MN-terminated split bearer 202 and a secondary node 204 with a SN-terminated split bearer 206. FIG. 6 shows a diagram illustrating a network side protocol termination options for MCG, SCG and split bearers in MR-DC with EPC (EN-DC) from TS 37.340, and FIG. 7 shows a diagram illustrating a network side protocol termination options for MCG, SCG and split bearers in MR-DC with 5GC (NGEN-DC, NE-DC and NR-DC) from TS 37.340. A MCG bearer, in MR-DC, is a radio bearer with an RLC bearer (or two RLC bearers, in case of CA packet duplication in an E-UTRAN cell group, or up to four RLC bearers in case of CA packet duplication in a NR cell group) only in the MCG. A MN-terminated bearer, in MR-DC, is a radio bearer for which PDCP is located in the MN. A SCG bearer, in MR-DC, is a radio bearer with an RLC bearer (or two RLC bearers, in case of CA packet duplication in an E-UTRAN cell group, or up to four RLC bearers in case of CA packet duplication in a NR cell group) only in the SCG. A SN-terminated bearer, in MR-DC, is a radio bearer for which PDCP is located in the SN. A split bearer, in MR-DC, is a radio bearer with RLC bearers both in MCG and SCG.

FIG. 2 shows a master node 200 comprising a CU-CP 210, a CU-UP 212 and a MCG-gNB-DU 214. Similarly, FIG. 2 shows a secondary node 204 comprising a CU-CP 220, a CU-UP 222 and a SCG-gNB-DU 224. As noted above, the disaggregated 5G architecture is defined in 3GPP decomposing the gNB into multiple logical entities, where the gNB-CU-CP hosts the PDCP(c) and RRC layers, gNB-CU-UP hosts the PDCP(u) and SDAP protocols, while the gNB-DU hosts the RLC, MAC and PHY layers. The scheduling operation takes place at the gNB-DU. The gNB-CU-Control Plane (gNB-CU-CP) is a logical node hosting the RRC and the control plane part of the PDCP protocol of the gNB-CU for an en-gNB or a gNB. The gNB-CU-CP terminates the E1 interface connected with the gNB-CU-UP and the F1-C interface connected with the gNB-DU. The gNB-CU-User Plane (gNB-CU-UP) is a logical node hosting the user plane part of the PDCP protocol of the gNB-CU for an en-gNB, and the user plane part of the PDCP protocol and the SDAP protocol of the gNB-CU for a gNB. The gNB-CU-UP terminates the E1 interface connected with the gNB-CU-CP and the F1-U interface connected with the gNB-DU. A gNB may consist of a gNB-CU-CP, multiple gNB-CU-UPs and multiple gNB-DUs.

To save SCG resources, especially energy, SCG activation/deactivation, when there is no data to be sent over the SCG, is under discussion. With a deactivated SCG, the UE's SCG leg is turned off and will not be available for data transmission. However, the decision on the resources to be used is made at the PDCP handling given DRB, which is hosted at the CU-UP, but the decision of SCG activation/deactivation is done at the CU-CP. For a MN-terminated DRB, the CU in question is the CU at the MN (210, 212). For a SN-terminated DRB, the CU in question is the CU at the SN (220, 222). The existing conventional E1 interface mechanism for informing about data activity at certain DRB, where CU-UP provides to CU-CP information in the bearer context inactivity notification message that there is no data, works only when the DRBs are configured exclusively with SCG resources (on RLC, MAC, and PHY layers). Thus, currently, in case MCG resources (on RLC, MAC, and PHY layers) are sufficient, the CU-CP would activate SCG unnecessarily or would not deactivate it, even though it is not used. With features as described herein, on the other hand, coordinating between the CU-UP and CU-CP the need of SCG resources may be provided such that they are activated only if needed.

Figure 3:
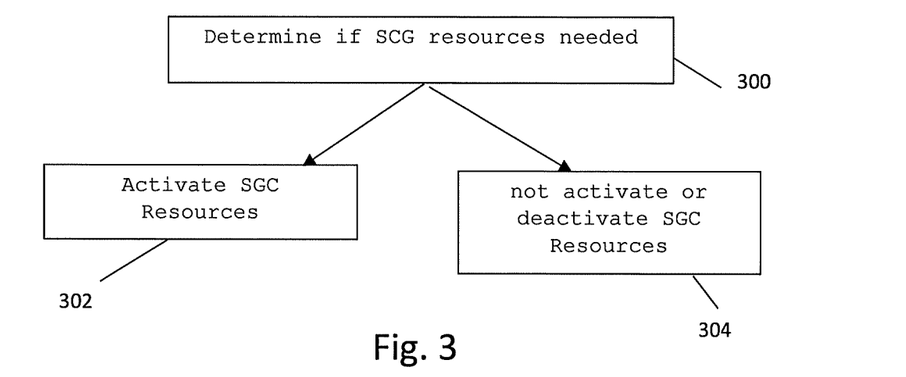
FIG. 3 is a diagram illustrating one example method.

Referring also to FIG. 3, with features as described herein, the CU-CP may be informed if, for DL data transmission, SCG resource are needed as indicated by block 300. In case SCG resources are needed they may be activated as indicated by block 302. If SCG resources are not needed they are not activated or, if already active, deactivated as indicated by block 304. To accomplish this, the E1 interface between CU-UP and CU-CP may be enhanced. The E1 interface is shown as E1-C in FIG. 2. Two example options, which can be used in combination, are described below.

Figure 4:
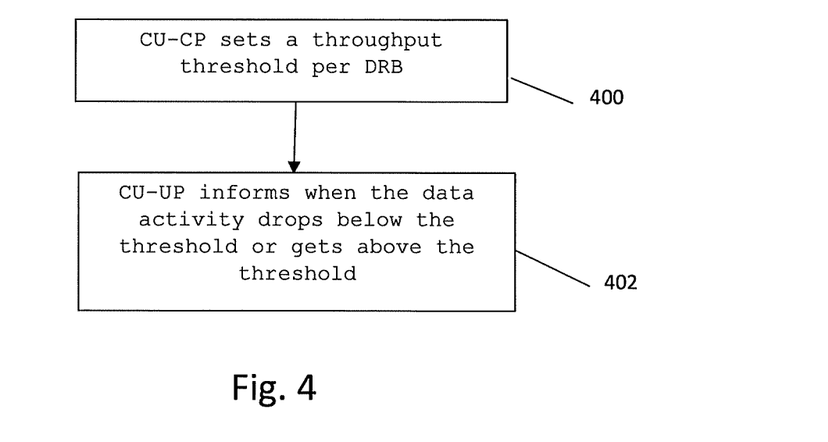
FIG. 4 is a diagram illustrating one example method.

Referring also to FIG. 4, in a first example option, the CU-CP sets a throughput threshold per DRB as indicated by block 400 and the CU-UP informs when the data activity drops below the threshold or gets above the threshold as indicated by block 402. This solution assumes the CU-CP knows the QoS levels at the MCG and the SCG (e.g. DL AMBR levels) and, thus, could set the threshold so that it corresponds to the MCG available throughput.

Figure 5:
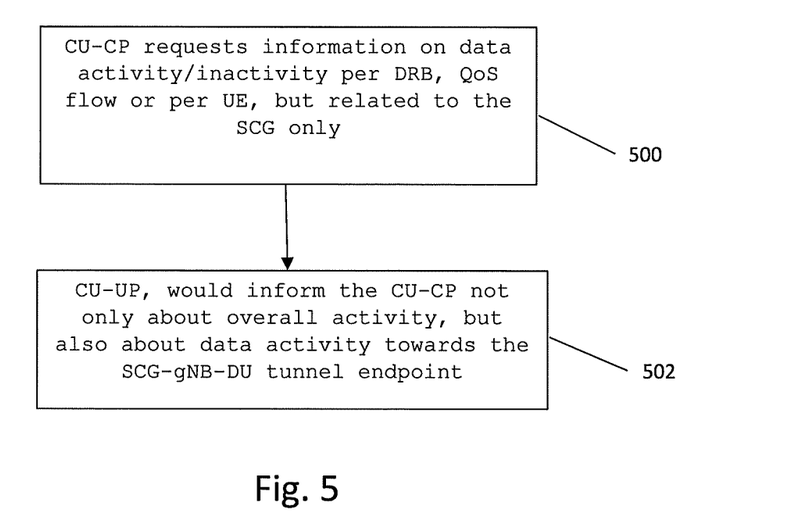
FIG. 5 is a diagram illustrating one example method.

Referring also to FIG. 5, in a second example option, the CU-CP requests information on data activity/inactivity per DRB, QoS flow or per UE as indicated by block 500, but related to the SCG only. So, the CU-UP, would inform the CU-CP not only about overall activity, but also about data activity from the CU-UP 222 towards the SCG-gNB-DU tunnel endpoint 224 as indicated by block 502.

Enhancing the already specified handling, the network can recognize if SCG resources are needed or not. The new throughput threshold is somehow the "counterpart" to the aggregated maximum bit rate (which is per UE and not DRB), which is used to limit the maximum bit rate. The new threshold or data activity parameter gives the minimum of a data rate which is used to deactivate the SCG resources, or the other way round it gives the minimum data rate the SCG resources are activated. This is new and has inventive character.

The coordination between CU-UP and CU-CP may be done on SN side. The CU-UP may inform when the data activity drops below the threshold or gets above it. This solution assumes the CU-CP knows the QoS levels at the MCG and the SCG (e.g. DL AMBR levels) and thus could set the threshold so that it corresponds to the MCG available throughput. AMBR is per UE, not per DRB. So, the SN does not know complete MCG's share of the AMBR. For nGBR traffic, the SN's CU-UP will never know when the DL MCG AMBR limit is hit (because there may be also MN terminated bearers that the SN has not info about). So, it must go as long as the flow control allows. Therefore, for the nGBR traffic, the example option 2 may be better, at least from purely standard perspective. One might expect that an operator could configure the SN such that, for no UE, the MCG limit is less than X and, thus, example option 1 could be used, too, but it is based on some assumptions. However, it does know the DRB's GBR for MCG leg for GBR traffic. There, the threshold-based example option 1 is perfectly feasible.

As noted above, features as described herein may be used to coordinate between the CU-UP and CU-CP (with the enhanced signaling on E1-C) the need of SCG resources, so that they are activated whenever the CU-UP needs them, but not always when there is only little data on the DRBs configured with SCG resources. The "little data" concerns amount of data that can be transmitted over MCG and, thus, the SCG leg is not needed. Normally, the DRB PDCP in the CU-UP pushes DL data as it pleases such as, for example, where flow is better. So, there is no strict split into "MCG data" and "SCG data" in case of a split bearer. However, if it has one leg blocked (such as for example an outage, as it exists already), it may push all the data through the other leg. This "little data" indicates an amount that can use the MCG resources and, thus, SCG may be deactivated (or not activated again). For a split bearer, data will go via both MCG and SCG (when the DRB is active). So, based on its previous experience (DRB active), the CU-UP may already know what amount of data could be sent via MCG. This can be remembered or predicted based on machine learning. The intention is to make sure that there is enough data in the SCG side before activating the SCG. Most of the trivial cases (such as, for example, where there is a single/few packets) will prevent SCG activation; which is a major gain from UE point of view. Once there is feedback from the MCG side that the data volume cannot be supported (or AI-ML based methods indicate enough data to activate SCG), SCG activation may be requested.

Features as described herein may be provided in standardization such as, for example, at least in TS 38.463 and TS 38.473.

There are ongoing discussion at RAN3 for the CU-UP to be informed about SCG status via a new E1AP message or reusing the flow control. This way CU-UP is enabled to avoid using SCG when deactivated, but the problem of informing the CU-CP that the SCG is needed and shall be activated, still exist. There are ongoing discussion at RAN3 for the UE to indicate it needs SCG for UL data. This solves the problem for the UL, but still, does not help to know when DL data require SCG resources.

With features as described herein, by enabling the coordination between the CU-UP and CU-CP SCG, resources and energy can be saved.

In accordance with one example, a method may be provided comprising: using master cell group resources for a downlink data transmission to a user equipment, wherein the user equipment is configured with at least one secondary cell group terminated split bearer and a secondary cell group is deactivated; determining, at a central unit user plane, when secondary cell group resources of the deactivated secondary cell group are needed, wherein the determining is based, at least partially, on a data volume threshold for a data radio bearer as configured by a central unit control plane; and based upon the determining that the secondary cell group resources are needed, sending a notification to the central unit control plane to trigger activation of the secondary cell group resources.

The determining of when secondary cell group resources are needed may comprise: setting a throughput threshold per data radio bearer, and detecting when at least one of: data activity drops below the throughput threshold, or data activity drops gets above the throughput threshold. The determining of when secondary cell group resources are needed may comprise monitoring information, related to the secondary cell group, regarding data activity and/or inactivity per at least one of: data radio bearer, quality of service flow, or per user equipment. The determining of when secondary cell group resources are needed may comprise at least one of: setting a throughput threshold per data radio bearer and detecting when data activity drops below the throughput threshold or gets above the throughput threshold, or monitoring information, related to the secondary cell group, regarding data activity and/or inactivity per at least one of: data radio bearer, quality of service flow, or per user equipment. The may further comprise, based upon determining that the secondary cell group resources are not needed, causing the secondary cell group resources to either: not activate the secondary cell group resources and using the master cell group resources for any downlink data received, that is below the throughput threshold, or if the secondary cell group resources are already active, deactivating the secondary cell group resources. The method may further comprise, based upon determining that the secondary cell group resources are needed, causing the central unit user plane to either: implicitly trigger the central unit control plane to activate secondary cell group resources by sending a notification regarding the data activity getting above a configured throughput threshold, or explicitly trigger the central unit control plane to activate secondary cell group resources by sending a secondary cell group activity request indication by including data activity information associated with the data path of secondary cell group distributed unit.

In accordance with another example, an example apparatus may be provided comprising at least one processor; and at least one non-transitory memory including computer program code, the at least one memory and the computer program code configured to, with the at least one processor, cause the apparatus to: use master cell group resources for a downlink data transmission to a user equipment, wherein the user equipment is configured with at least one secondary cell group terminated split bearer and a secondary cell group is deactivated; determine, at a central unit user plane, when secondary cell group resources of the deactivated secondary cell group are needed, wherein the determining is based, at least partially, on a data volume threshold for a data radio bearer as configured by a central unit control plane; and based upon the determining that the secondary cell group resources are needed, send a notification to the central unit control plane to trigger activation of the secondary cell group resources.

The at least one memory and the computer program code may be configured to, with the at least one processor, cause the apparatus to determine when secondary cell group resources are needed comprising: setting a throughput threshold per data radio bearer, and detecting when at least one of: data activity drops below the throughput threshold, or data activity drops gets above the throughput threshold. The at least one memory and the computer program code may be configured to, with the at least one processor, cause the apparatus to determine when secondary cell group resources are needed comprising monitoring information, related to the secondary cell group, regarding data activity and/or inactivity per at least one of: data radio bearer, quality of service flow, or per user equipment. The at least one memory and the computer program code may be configured to, with the at least one processor, cause the apparatus to determine when secondary cell group resources are needed comprising at least one of: setting a throughput threshold per data radio bearer and detecting when data activity drops below the throughput threshold or gets above the throughput threshold, or monitoring information, related to the secondary cell group, regarding data activity and/or inactivity per at least one of: data radio bearer, quality of service flow, or per user equipment. The at least one memory and the computer program code may be configured to, with the at least one processor, cause the apparatus to, based upon determining that the secondary cell group resources are not needed, causing the secondary cell group resources to either: not activate the secondary cell group resources and using the master cell group resources for any downlink data received, that is below the throughput threshold, or if the secondary cell group resources are already active, deactivating the secondary cell group resources. The at least one memory and the computer program code may be configured to, with the at least one processor, cause the apparatus to, based upon determining that the secondary cell group resources are needed, causing the central unit user plane to either: implicitly trigger the central unit control plane to activate secondary cell group resources by sending a notification regarding the data activity getting above a configured throughput threshold, or explicitly trigger the central unit control plane to activate secondary cell group resources by sending a secondary cell group activity request indication by including data activity information associated with the data path of secondary cell group distributed unit. The CU-UP may inform explicitly that SCG is needed irrespective if a threshold is set or not.

In accordance with another example, an example non-transitory program storage device may be provided, readable by a machine, tangibly embodying a program of instructions executable by the machine for performing operations, the operations comprising: using master cell group resources for a downlink data transmission to a user equipment, wherein the user equipment is configured with at least one secondary cell group terminated split bearer and a secondary cell group is deactivated; determining, at a central unit user plane, when secondary cell group resources of the deactivated secondary cell group are needed, wherein the determining is based, at least partially, on a data volume threshold for a data radio bearer as configured by a central unit control plane; and based upon the determining that the secondary cell group resources are needed, sending a notification to the central unit control plane to trigger activation of the secondary cell group resources.

In accordance with another example, an example apparatus may be provided comprising: means for using master cell group resources for a downlink data transmission to a user equipment, wherein the user equipment is configured with at least one secondary cell group terminated split bearer and a secondary cell group is deactivated; means for determining, at a central unit user plane, when secondary cell group resources of the deactivated secondary cell group are needed, wherein the determining is based, at least partially, on a data volume threshold for a data radio bearer as configured by a central unit control plane; and means for, based upon the determining that the secondary cell group resources are needed, sending a notification to the central unit control plane to trigger activation of the secondary cell group resources.

In accordance with another example, an example apparatus may be provided comprising processing circuitry; and memory circuitry including computer program code, where the memory circuitry and the computer program code configured to, with the processing circuitry, cause the apparatus to: use master cell group resources for a downlink data transmission to a user equipment, wherein the user equipment is configured with at least one secondary cell group terminated split bearer and a secondary cell group is deactivated; determine, at a central unit user plane, when secondary cell group resources of the deactivated secondary cell group are needed, wherein the determining is based, at least partially, on a data volume threshold for a data radio bearer as configured by a central unit control plane; and based upon the determining that the secondary cell group resources are needed, send a notification to the central unit control plane to trigger activation of the secondary cell group resources.

In accordance with another example, an example method may be provided comprising: determining, by a central unit user plane, required secondary cell group resources; and sending information from the central unit user plane to a central unit control plane, where the information comprises activity information associated with a data path of a secondary cell group, where the information is at least partially based upon the determining by the central unit user plane, and where the information is configured to be used by the central unit control plane to trigger activation of the secondary cell group resources. The determining may comprise use of at least one throughput threshold for at least one respective data radio bearer.

In accordance with another example, an example an apparatus may be provided comprising at least one processor; and at least one non-transitory memory including computer program code, the at least one memory and the computer program code configured to, with the at least one processor, cause the apparatus to: determine, by a central unit user plane, required secondary cell group resources; and send information from the central unit user plane to a central unit control plane, where the information comprises activity information associated with a data path of a secondary cell group, where the information is at least partially based upon the determining by the central unit user plane, and where the information is configured to be used by the central unit control plane to trigger activation of the secondary cell group resources.

In accordance with another example, an example a non-transitory program storage device may be provided, readable by a machine, tangibly embodying a program of instructions executable by the machine for performing operations, the operations comprising: determining, by a central unit user plane, required secondary cell group resources; and sending information from the central unit user plane to a central unit control plane, where the information comprises activity information associated with a data path of a secondary cell group, where the information is at least partially based upon the determining by the central unit user plane, and where the information is configured to be used by the central unit control plane to trigger activation of the secondary cell group resources.

In accordance with another example, an example apparatus may be provided comprising means for determining, by a central unit user plane, required secondary cell group resources; and means for sending information from the central unit user plane to a central unit control plane, where the information comprises activity information associated with a data path of a secondary cell group, where the information is at least partially based upon the determining by the central unit user plane, and where the information is configured to be used by the central unit control plane to trigger activation of the secondary cell group resources.

In accordance with another example, an example apparatus may be provided comprising processing circuitry; and memory circuitry including computer program code, where the memory circuitry and the computer program code configured to, with the processing circuitry, cause the apparatus to: determine, by a central unit user plane, required secondary cell group resources; and send information from the central unit user plane to a central unit control plane, where the information comprises activity information associated with a data path of a secondary cell group, where the information is at least partially based upon the determining by the central unit user plane, and where the information is configured to be used by the central unit control plane to trigger activation of the secondary cell group resources.

In accordance with another example, an example method may be provided comprising: receiving by a central unit control plane information from a central unit user plane, where the information is based upon a determination by the central unit user plane that secondary cell group resources are required; and based, at least partially, upon the central unit control plane receiving the information from the central unit user plane, the central unit control plane causing activation of the secondary cell group resources. The method may further comprise the central unit control plane requesting the information from the central unit user plane. The requested information may comprise, for a secondary cell group, data activity and/or data inactivity for at least one of: respective data radio bearers, respective quality of service flows, or respective user equipments.

In accordance with another example, an example apparatus may be provided comprising at least one processor; and at least one non-transitory memory including computer program code, the at least one memory and the computer program code configured to, with the at least one processor, cause the apparatus to: receive by a central unit control plane information from a central unit user plane, where the information is based upon a determination by the central unit user plane that secondary cell group resources are required; and based, at least partially, upon the central unit control plane receiving the information from the central unit user plane, the central unit control plane causing activation of the secondary cell group resources.

In accordance with another example, an example non-transitory program storage device may be provided, readable by a machine, tangibly embodying a program of instructions executable by the machine for performing operations, the operations comprising: receiving by a central unit control plane information from a central unit user plane, where the information is based upon a determination by the central unit user plane that secondary cell group resources are required; and based, at least partially, upon the central unit control plane receiving the information from the central unit user plane, the central unit control plane causing activation of the secondary cell group resources.

In accordance with another example, an example apparatus may be provided comprising means for receiving by a central unit control plane information from a central unit user plane, where the information is based upon a determination by the central unit user plane that secondary cell group resources are required; and based, at least partially, upon the central unit control plane receiving the information from the central unit user plane, means for the central unit control plane to cause activation of the secondary cell group resources.

In accordance with another example, an example processing circuitry; and memory circuitry including computer program code, where the memory circuitry and the computer program code configured to, with the processing circuitry, cause the apparatus to: receive by a central unit control plane information from a central unit user plane, where the information is based upon a determination by the central unit user plane that secondary cell group resources are required; and based, at least partially, upon the central unit control plane receiving the information from the central unit user plane, the central unit control plane causing activation of the secondary cell group resources.

In accordance with another example, an example method may be provided comprising determining, by a central unit user plane, that secondary cell group resources are needed; and based upon the determination by the central unit user plane that the secondary cell group resources are needed, the central unit user plane causing at least one of: implicitly triggering a central unit control plane to activate secondary cell group resources by sending from the central unit user plane a notification regarding data activity getting above a configured throughput threshold, or explicitly triggering the central unit control plane to activate the secondary cell group resources by sending a secondary cell group activity request indication by including data activity information associated with a data path of a secondary cell group distributed unit.

In accordance with another example, an example apparatus may be provided comprising at least one processor; and at least one non-transitory memory including computer program code, the at least one memory and the computer program code configured to, with the at least one processor, cause the apparatus to: determine, by a central unit user plane, that secondary cell group resources are needed; and based upon the determination by the central unit user plane that the secondary cell group resources are needed, for the central unit user plane to cause at least one of: implicitly trigger a central unit control plane to activate secondary cell group resources by sending from the central unit user plane a notification regarding data activity getting above a configured throughput threshold, or explicitly trigger the central unit control plane to activate the secondary cell group resources by sending a secondary cell group activity request indication by including data activity information associated with a data path of a secondary cell group distributed unit.

In accordance with another example, an example non-transitory program storage device may be provided, readable by a machine, tangibly embodying a program of instructions executable by the machine for performing operations, the operations comprising: determining, by a central unit user plane, that secondary cell group resources are needed; and based upon the determination by the central unit user plane that the secondary cell group resources are needed, the central unit user plane causing at least one of: implicitly triggering a central unit control plane to activate secondary cell group resources by sending from the central unit user plane a notification regarding data activity getting above a configured throughput threshold, or explicitly triggering the central unit control plane to activate the secondary cell group resources by sending a secondary cell group activity request indication by including data activity information associated with a data path of a secondary cell group distributed unit.

In accordance with another example, an example apparatus may be provided comprising processing circuitry; and memory circuitry including computer program code, where the memory circuitry and the computer program code configured to, with the processing circuitry, cause the apparatus to: determine, by a central unit user plane, that secondary cell group resources are needed; and based upon the determination by the central unit user plane that the secondary cell group resources are needed, for the central unit user plane to cause at least one of: implicitly triggering a central unit control plane to activate secondary cell group resources by sending from the central unit user plane a notification regarding data activity getting above a configured throughput threshold, or explicitly triggering the central unit control plane to activate the secondary cell group resources by sending a secondary cell group activity request indication by including data activity information associated with a data path of a secondary cell group distributed unit.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
   using master cell group resources for a downlink data transmission to a user equipment, wherein the user equipment is configured with at least one secondary cell group terminated split bearer and a secondary cell group is deactivated;
   determining, at a central unit user plane, when secondary cell group resources of the deactivated secondary cell group are needed, wherein the determining is based, at least partially, on a data volume threshold for a data radio bearer as configured by a central unit control plane; and
   based upon the determining that the secondary cell group resources are needed, sending a notification to the central unit control plane to trigger activation of the secondary cell group resources,
   wherein the determining of when secondary cell group resources are needed comprises monitoring information, related to the secondary cell group, regarding data activity and inactivity per:
   data radio bearer,
   quality of service flow, and
   per user equipment,
   the method further comprising:
   based upon determining that the secondary cell group resources are not needed, causing the secondary cell group resources to:
   if the secondary cell group resources are already active, deactivating the secondary cell group resources,
   based upon determining that the secondary cell group resources are needed, causing the central unit user plane to:
   explicitly trigger the central unit control plane to activate secondary cell group resources by sending a secondary cell group activity request indication by including data activity information associated with the data path of secondary cell group distributed unit,
   wherein the determining of when secondary cell group resources are needed further comprises:
   setting a throughput threshold per data radio bearer, and detecting when:
   data activity drops below the throughput threshold, and
   data activity drops gets above the throughput threshold.

2. The method of claim 1, wherein coordination between the central unit user plane and the central unit control plane is performed on the secondary node side and the central unit user plane informs when the data activity drops below the threshold or gets above the threshold, wherein the central unit control plane knows the quality of service levels at a master cell group and the secondary cell group sets the threshold to correspond to the master cell group available throughput, where aggregate maximum bit rate is per user equipment and the secondary node does not know the aggregate maximum bit rate is per user equipment and not per data radio bearer.

3. A method comprising:
   determining, by a central unit user plane, required secondary cell group resources; and
   sending information from the central unit user plane to a central unit control plane, where the information comprises activity information associated with a data path of a secondary cell group, where the information is at least partially based upon the determining by the central unit user plane, and where the information is configured to be used by the central unit control plane to trigger activation of the secondary cell group resources,
   wherein the determining comprises use of at least one throughput threshold for at least one respective data radio bearer,
   wherein the method further comprises:
   the central unit user plane receiving a request for additional information from the central unit user plane,
   wherein the requested additional information comprises, for a secondary cell group, data activity and data inactivity for:
   respective data radio bearers,
   respective quality of service flows, and
   respective user equipments.

4. A method comprising:
   receiving by a central unit control plane information from a central unit user plane, where the information is based upon a determination by the central unit user plane that secondary cell group resources are required; and
   based, at least partially, upon the central unit control plane receiving the information from the central unit user plane, the central unit control plane causing activation of the secondary cell group resources,
wherein the method further comprises:
the central unit control plane requesting the information from the central unit user plane,
wherein the requested information comprises, for a secondary cell group, data activity and data inactivity for:
respective data radio bearers,
respective quality of service flows, and
respective user equipments.

* * * * *